Sept. 18, 1928.
J. GIRARDET
1,685,051
LIQUID LEVEL INDICATOR
Filed May 19, 1925
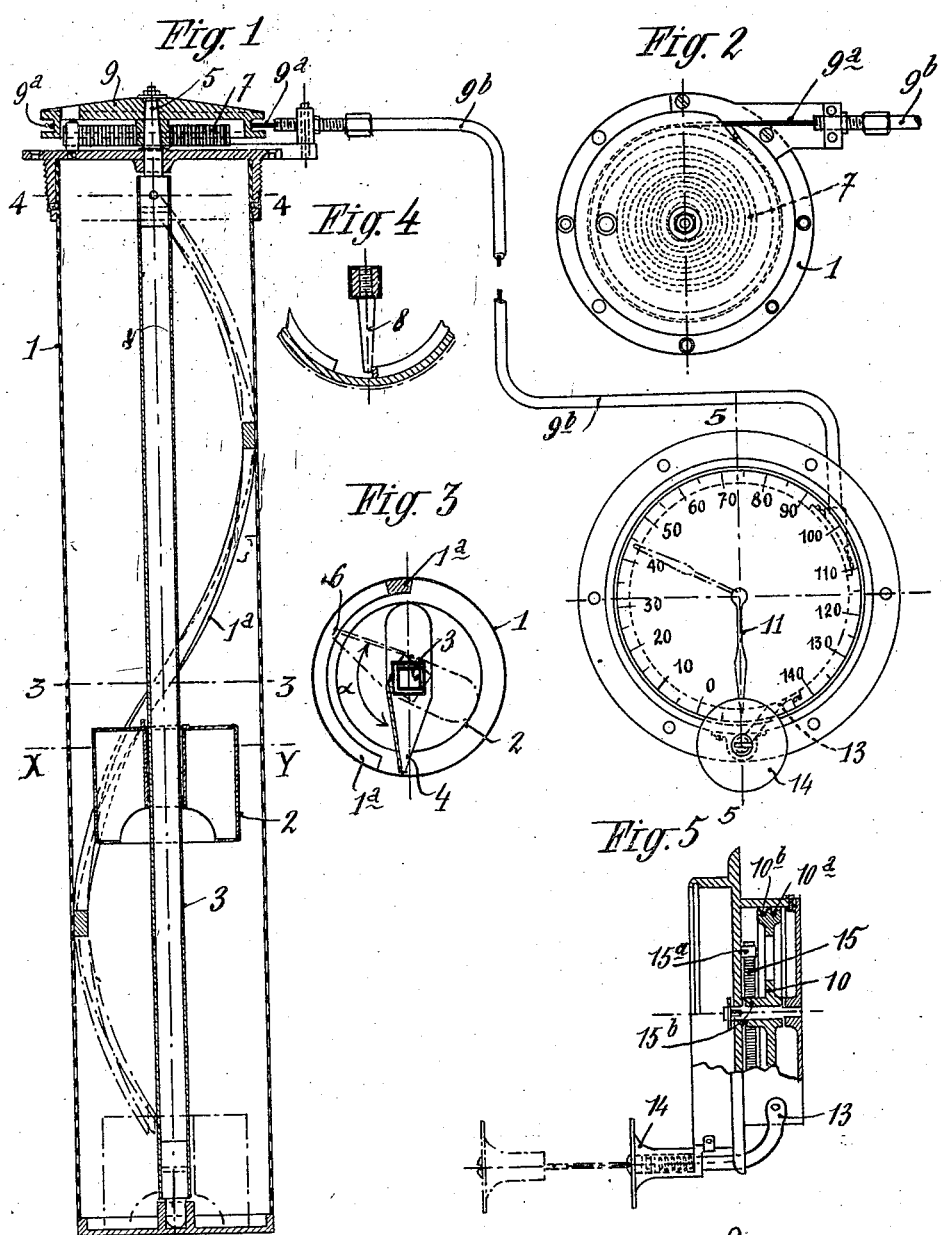

Patented Sept. 18, 1928.

1,685,051

UNITED STATES PATENT OFFICE.

JACQUES GIRARDET, OF PARIS, FRANCE.

LIQUID-LEVEL INDICATOR.

Application filed May 19, 1925, Serial No. 31,299, and in France April 14, 1925.

Known level indicating devices are in use for the measurement at a distance of the volume of liquid in a receptacle, these consisting in principle of a perforated cylinder having the same height as the said receptacle and having a central shaft or upright upon which is slidable a suitable float, the latter being guided upon the said shaft while it is also enabled to follow the angular movement of the latter.

In this type of apparatus, the level is measured at a distance by rotating the shaft in such manner as to bring a projection or tappet mounted upon the said float into contact with a helical ramp which is disposed upon the internal wall of the cylinder; the angle of rotation of the float is measured by the displacement of a pointer upon a dial, the apparatus being so arranged that the dial will afford the direct reading of the amount of liquid in the said receptacle.

My invention has for its object a level indicating apparatus of this class, which offers the following particular features:

(a) The float shaft is rotated by a pulley which is provided with a reaction spring and to which is attached the cable of a Bowden power transmission device whereof the other end is disposed in one groove of a double grooved pulley which is secured to an indicating pointer; the said pulley is rotated by traction exercised upon a second cable having at the end a drawing button or knob.

(b) A reaction spring is further mounted on the said double-grooved pulley in order to diminish the effort of traction which is necessary to rotate the said float, and enable the use of the indicating or gauging device in the case in which the path of the cable comprises a certain number of elbows of small radius.

The following description, with reference to the appended drawings which are given by way of example, sets forth an embodiment of my said invention.

Fig. 1 is a sectional view of the gauging or level indicating device, and,

Fig. 2 is a corresponding plan view.

Figs. 3 and 4 are respective sections on the lines 3—3 and 4—4 of Fig. 1.

Fig. 5 is a sectional view of the indicating dial on the line 5—5 of Fig. 1.

The indicating device comprises a cylinder 1, designated as the plunger, which consists of perforated sheet metal having the same height as the receptacle into which it is immersed. Upon the internal face of the said cylinder, and projecting therefrom, is the helical ramp 1$^a$, Fig. 1. Within the said plunger is provided a movable element consisting of the float 2 which is vertically slidable on the upright 3. The latter has a rectangular cross section, and co-operates with a suitable channel of like section which is formed in the said float but which has a slightly larger size, to provide for the vertical motion of the float without friction. The said float is not only guided in its vertical movement by the said upright, but it further participates in the rotation which is imparted to the latter.

The said float is provided with a projecting member 4 consisting of a plate which is soldered to the top of the float. Supposing the said upright 3 to occupy the position shown in Fig. 1, with the receptacle empty, the float will be situated at the lower part of the plunger, as shown in the dotted lines, and the projecting member will have the position which is shown in the section Fig. 3. The said upright will have a well-defined position which is designated as the dead centre.

When the receptacle is filled, the float will rise with the liquid, while otherwise maintaining the same position, i. e. the projecting member of the float will remain in the position which it occupied when the receptacle was empty. The level of the liquid attains for instance the position X—Y. The shaft 5 which is disposed at the end of the said upright is now rotated (by external means) in the clockwise direction, and the float will be consequently rotated, but the motion will cease when the projection of the float enters into contact at 6 with the said helical ramp. A suitable contact, with arrest of the motion, will in fact be produced since the angle of contact of the projection and the ramp is greater than 45°. In this event, the said upright with the shaft 5 will have moved through an angle $\alpha$.

It will be noted that each height of the liquid corresponds to an operation in which the device is rotated through a given angle. In the particular case in which the receptacle is full of liquid, i. e. the level of the liquid is at the top of the plunger, the angle $\alpha$ will be $2\pi$, representing a complete rotation.

The amount of rotation of the shaft 5, starting from the dead centre, will depend upon the height of the liquid in the receptacle and hence upon its volume. A stop-piece 8 limits the action of the spring 7, so that the said upright shall never exceed the dead point.

The shaft 5 is rotated by means of a cable 9ª forming part of a Bowden power transmission device 9ᵇ. One end of the said cable is attached to a pulley 9, and the other end of the cable is disposed in the groove 10ª of a pulley 10 which is secured to its shaft upon which is fixed the pointer 11 of the indicating dial. In a second groove 10ᵇ in the pulley 10 is disposed a second cable which issues from the dial at 13 and has mounted at the end a drawing knob 14. The dial is provided with a graduated scale showing in a direct manner the number of liters of liquid remaining in the said receptacle, and the said dial is mounted upon the instrument board, in the case of motor vehicles or aeroplanes.

By drawing upon the knob 14, the cable is unwound from the groove 10ᵇ, and the pulley 10 is thus rotated. The end of the Bowden cable will thus be wound in the groove 10ª, so that the pulley 9 will turn in the clockwise direction.

The operation of the apparatus is as follows:

With the apparatus in the inoperative position, the volute spring 7 maintains the upright 3 in the position of the dead centre. The pointer on the said dial now indicates "dead centre", and the said drawing knob is in contact with the dial.

When the operator is to make a measurement, he draws upon the said knob, thus drawing out the cable, and the latter will rotate both the pulley 10 of the dial and the pulley 9 of the plunger. This rotation stops when the projection 4 of the float comes into contact with the said ramp. The operator then takes the reading by observing the scale division which is in coincidence with the pointer. After taking the reading, he releases the said knob, and the spring 7 will restore the whole to the inoperative position.

To facilitate the functioning of the apparatus, and chiefly in the case in which the path of the Bowden device comprises a certain number of elbows of slight curvature, I prefer to employ a reaction spring 15 disposed upon the pulley 10, within the case of the said dial, said spring being antagonistic to the traction exercised when the operator draws upon the said knob, the spring thus acting in the same direction as the spring 7. The spring 15 may have any desired range of action, and in particular, I prefer to give the spring 7 a tension which is 1/5 that of the spring 15.

What I claim is:—

1. A level indicating apparatus for receptacles containing liquids, comprising a perforated cylinder having the same height as the said receptacle, a rotatable upright coaxial with said cylinder, a float slidable on the said upright, a helical ramp disposed within the said cylinder, a tappet secured to the said float and adapted to enter into contact with said ramp when the said upright is rotated, a pulley for rotating the said upright, an indicating dial, a pointer cooperating therewith, a pulley for operating the pointer, a Bowden power transmission device interposed between the two pulleys, and manually operated means for rotating the pointer operating pulley.

2. A level indicating apparatus for receptacles containing liquids, comprising a perforated cylinder having the same height as the said receptacle, a rotatable upright coaxial with said cylinder, a float slidable on the said upright, a helical ramp disposed within the said cylinder, a tappet secured to the said float and adapted to enter into contact with the said ramp, an indicating dial, a pointer cooperating therewith, means whereby the angular displacement of said pointer shall be controlled by the angular displacement of the said upright, means including said first named means for the distant control of the rotation of the said upright, means for returning the upright to the initial position, and means for returning said pointer to the initial position and cooperating with the said means provided upon the cylinder for the return of the upright to the initial position.

3. A level indicating apparatus for receptacles containing liquids, comprising a perforated cylinder having the same height as the said receptacle, a rotatable upright coaxial with said cylinder, a float slidable on the said upright, a helical ramp disposed within the said cylinder, a tappet secured to the said float and adapted to enter into contact with said ramp, a pulley secured to the upper end of the said upright and situated at the exterior of the said cylinder, a reaction spring secured to said pulley, an indicating dial, a pointer cooperating therewith, a pulley for operating the said pointer, a Bowden power transmission device interposed between the two pulleys, a reaction spring mounted upon the pulley of the indicator, and means for rotating the last named pulley.

4. A level indicating apparatus for receptacles containing liquids, comprising a perforated cylinder having the same height as the said receptacle, a rotatable upright coaxial with said cylinder, a float slidable on the said upright, a helical ramp disposed within the said cylinder, a tappet secured to the said float and adapted to enter into contact with said ramp, a pulley keyed to the upper end of the said upright and situated at the exterior of the said cylinder, a reaction spring secured to said pulley, an indicating dial, a pointer cooperating therewith, a double grooved pulley for operating the said pointer, a Bowden power transmission device interposed between the two pulleys and whereof the cable is attached at one end to the said pulley mounted on the upright and at the other end to the indicator pulley, a second cable disposed in the second groove of the pulley of the said indicating dial, a knob attached to the outer end of the second cable for drawing upon the latter, and a reaction spring mounted upon the pulley of the indicating dial.

In testimony that I claim the foregoing as my invention, I have signed my name hereto.

JACQUES GIRARDET.